US012570830B2

(12) United States Patent
Saito

(10) Patent No.: US 12,570,830 B2
(45) Date of Patent: Mar. 10, 2026

(54) PHENOTHIAZINE DERIVATIVE AND ACRYLIC RUBBER COMPOSITION

(71) Applicant: UNIMATEC CO., LTD., Tokyo (JP)

(72) Inventor: Satoru Saito, Ibaraki (JP)

(73) Assignee: UNIMATEC CO., LTD., Tokyo (JP)

( * ) Notice: Subject to any disclaimer, the term of this patent is extended or adjusted under 35 U.S.C. 154(b) by 520 days.

(21) Appl. No.: 18/024,085

(22) PCT Filed: Jun. 24, 2021

(86) PCT No.: PCT/JP2021/023915
§ 371 (c)(1),
(2) Date: Mar. 1, 2023

(87) PCT Pub. No.: WO2022/049872
PCT Pub. Date: Mar. 10, 2022

(65) Prior Publication Data

US 2023/0323086 A1 Oct. 12, 2023

(30) Foreign Application Priority Data

Sep. 3, 2020 (JP) ................................ 2020-148107

(51) Int. Cl.

| | |
|---|---|
| ***C08K 5/46*** | (2006.01) |
| ***C07D 279/34*** | (2006.01) |
| ***C08K 5/17*** | (2006.01) |
| ***C08K 5/18*** | (2006.01) |
| ***C08K 5/31*** | (2006.01) |

(52) U.S. Cl.
CPC .................. *C08K 5/46* (2013.01); *C08K 5/17* (2013.01); *C08K 5/31* (2013.01)

(58) Field of Classification Search
CPC ................................ C08K 5/46; C07D 279/34
See application file for complete search history.

(56) References Cited

U.S. PATENT DOCUMENTS

| | | | | |
|---|---|---|---|---|
| 6,093,853 | A | 7/2000 | Nakagome et al. | |
| 6,329,551 | B1 | 12/2001 | Nakagome et al. | |
| 8,029,919 | B2 | 10/2011 | Gessner et al. | |
| 8,288,483 | B2 | 10/2012 | Ito et al. | |
| 8,609,753 | B2 * | 12/2013 | Ogawa ................. | C07D 279/34 525/329.7 |
| 8,937,121 | B2 * | 1/2015 | Sakamoto ............ | C07D 279/34 544/35 |
| 11,254,802 | B2 * | 2/2022 | Sugawara ............ | C08K 5/3415 |
| 2002/0016508 | A1 | 2/2002 | Nakagome et al. | |
| 2005/0159519 | A1 | 7/2005 | Nakagome et al. | |
| 2008/0071014 | A1 | 3/2008 | Ohishi et al. | |
| 2009/0192055 | A1 | 7/2009 | Engelhardt et al. | |
| 2010/0308714 | A1 | 12/2010 | Gessner et al. | |
| 2011/0040043 | A1 | 2/2011 | Ito et al. | |
| 2012/0302674 | A1 * | 11/2012 | Ogawa ................. | C08K 5/3417 524/89 |
| 2012/0302675 | A1 * | 11/2012 | Sakamoto ............ | C07D 209/88 544/35 |

(Continued)

FOREIGN PATENT DOCUMENTS

| | | | |
|---|---|---|---|
| JP | 11-021411 | A | 1/1999 |
| JP | 2008-521947 | A | 6/2008 |

(Continued)

OTHER PUBLICATIONS

Marina Frank et al.: "Assembly and Stepwise Oxidation of Interpenetrated Coordination Cages Based on Phenothiazine", Angewandte Chemie International Edition, Verlag Chemie, Hoboken, USA, vol. 52, No. 38, Jul. 23, 2013, pp. 10102-10106, XP072069898, ISSN:1433-7851, DOI:10.1002/ANIE.201302536.
Theriault et al., "Optical and Electrochemical Properties of Ethynylaniline Derivatives of Phenothiazine, Phenothiazine-5-oxide and Phenothiazine-5,5-dioxide", Physical Chemistry Chemical Physics, vol. 16 (24), 2014, pp. 12266-12274.
International Search Report and Written Opinion of the International Searching Authority issued in International Pat. Appl. No. PCT/JP2021/023915, dated Jul. 27, 2021, along with an English translation thereof.
International Preliminary Report on Patentability issued in International Pat. Appl. No. PCT/JP2021/023915, dated Mar. 7, 2023, along with an English translation thereof.

*Primary Examiner* — Karuna P Reddy
(74) *Attorney, Agent, or Firm* — Greenblum & Bernstein, P.L.C.

(57) ABSTRACT

A phenothiazine derivative represented by the general formula:

[I]

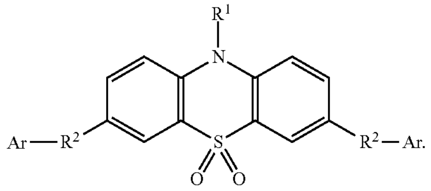

(wherein $R^1$ is a monovalent aliphatic hydrocarbon group having 1 to 20 carbon atoms or an aralkyl group having 7 to 20 carbon atoms, and $R^2$·Ar is an aralkyl group, wherein $R^2$ is a divalent aliphatic hydrocarbon group having 1 to 10 carbon atoms, and Ar is a monovalent aromatic hydrocarbon group having 6 to 10 carbon atoms), and a carboxyl group-containing acrylic rubber composition comprising, based on 100 parts by weight of carboxyl group-containing acrylic rubber:

(A) 0.1 to 5 parts by weight of the phenothiazine derivative represented by the formula [I];
(B) 0.1 to 3 parts by weight of a crosslinking agent for carboxyl group-containing acrylic rubber; and
(C) 0.1 to 5 parts by weight of a crosslinking accelerator for carboxyl group-containing acrylic rubber.

8 Claims, 1 Drawing Sheet

(56) References Cited

U.S. PATENT DOCUMENTS

| | | | | |
|---|---|---|---|---|
| 2015/0087754 | A1* | 3/2015 | Sakamoto | C07D 279/34 544/35 |
| 2019/0106552 | A1* | 4/2019 | Sugawara | C08K 5/21 |
| 2019/0112466 | A1* | 4/2019 | Sugawara | C08L 33/26 |
| 2019/0372163 | A1* | 12/2019 | Guarr | H01G 11/64 |
| 2020/0002507 | A1* | 1/2020 | Sugawara | C07D 209/66 |

FOREIGN PATENT DOCUMENTS

| | | | | |
|---|---|---|---|---|
| JP | 2010-174217 | A | 8/2010 | |
| JP | 2010-254579 | A | 11/2010 | |
| JP | 2012-180390 | A | 9/2012 | |
| JP | 2012-211239 | A | 11/2012 | |
| JP | 2013-028754 | A | 2/2013 | |
| JP | 2014-167048 | A | 9/2014 | |
| JP | 2015-137322 | A | 7/2015 | |
| JP | 2015-137323 | A | 7/2015 | |
| JP | 2015-227402 | A | 12/2015 | |
| JP | 2020-111552 | A | 7/2020 | |
| WO | 2006/001299 | A1 | 1/2006 | |
| WO | 2009/096545 | A1 | 8/2009 | |
| WO | 2011/058918 | A1 | 5/2011 | |
| WO | 2011/093443 | A1 | 8/2011 | |
| WO | 2015/098911 | A1 | 7/2015 | |
| WO | 2015/141785 | A1 | 9/2015 | |
| WO | 2017/170042 | A1 | 10/2017 | |
| WO | 2017/170043 | A1 | 10/2017 | |
| WO | WO-2018159459 | A1 * | 9/2018 | C07D 209/76 |

* cited by examiner

[Fig. 1]
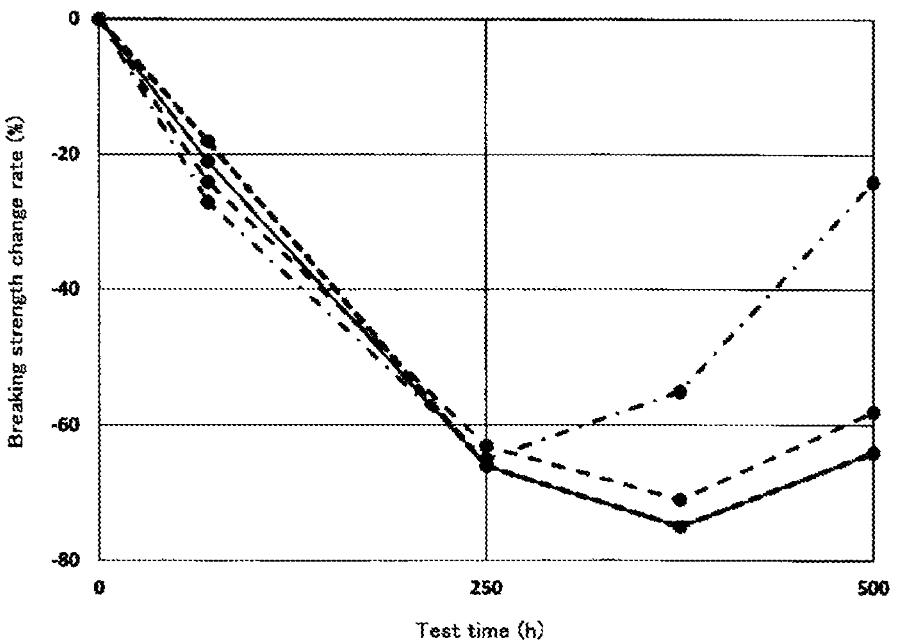
[Fig. 2]
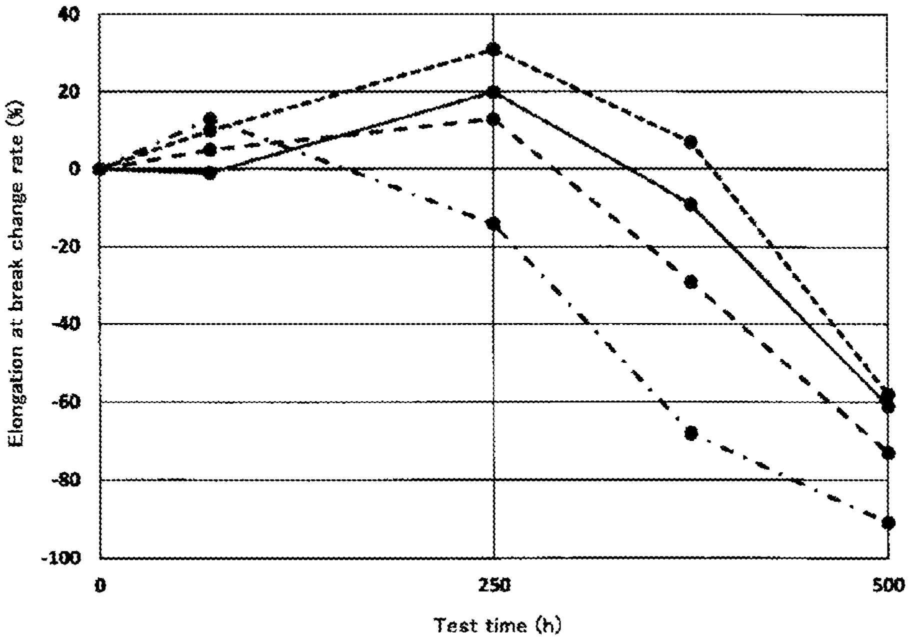

PHENOTHIAZINE DERIVATIVE AND ACRYLIC RUBBER COMPOSITION

TECHNICAL FIELD

The present invention relates to a phenothiazine derivative and a carboxyl group-containing acrylic rubber composition comprising the same. More particularly, the present invention relates to a phenothiazine derivative that can improve the heat resistance of acrylic rubber, and a carboxyl group-containing acrylic rubber composition comprising the same.

BACKGROUND ART

Environmental regulations, as typified by $CO_2$ emission regulations, tend to become more stringent as a countermeasure against global warming. As the countermeasure, automobile engines are required to have higher output, higher thermal efficiency, and reduction and harmlessness of emission gas, and the temperature in the engine compartment tends to rise. In accordance with this, rubber materials used in the surrounding area are required to have further improved heat resistance.

As specific examples, vehicles are becoming widespread equipped with a turbocharger system for the purpose of improving the fuel efficiency of the engine. Since air guided from the turbocharger to the intercooler and engine has high temperature and high pressure, high heat resistance is required for rubber hose materials that transport the air.

Thus, in response to the demand for higher temperatures of the use environment and longer service life of rubber materials used in automobile engines, it is generally carried out to improve heat resistance by adding appropriate antioxidants to rubber product parts.

Even in the case of acrylic rubber, phenolic and amine-based antioxidants are used as antioxidants for the purpose of life extension. Amine-based antioxidants include diphenylamine-based antioxidants, and typical examples thereof include 4,4'-bis(α,α-dimethylbenzyl)diphenylamine (Patent Documents 1 to 4).

Moreover, in recent years, many patent documents indicate that phenothiazine-based antioxidants are effective as antioxidants for rubber materials.

As a rubber material that has excellent vulcanization characteristics, mechanical characteristics, and heat aging characteristics, and that is particularly suitable for use in anti-vibration rubber, Patent Document 5 discloses one comprising (A) a diene-based rubber, (B) a bismaleimide compound, and (C) the following phenothiazine compound:

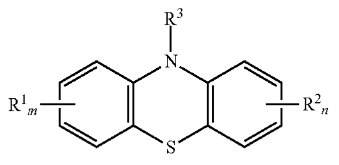

$R^1$, $R^2$: a hydrogen atom, a $C_1$-$C_8$ alkyl group that may be substituted with an aromatic ring, an alkoxy group, a halogen atom, or a cyano group $R^3$: a hydrogen atom, a $C_1$-$C_6$ chain or cyclic alkyl group, a vinyl group, or an aromatic group m, n: 0 to 2

However, among the above compounds, those wherein $R^3$ is other than a hydrogen atom, have not been demonstrated for their effects by specific examples. In addition, no mention is made to those wherein $R^1$ and $R^2$ are aralkyl groups. Further, no mention is made to those wherein the oxidation state of the sulfur atom at position 5 is a sulfoxide or sulfone group.

Furthermore, a phenothiazine compound wherein the sulfur atom at position 5 is —$SO_2$— is also known, and is described, for example, in Patent Document 6. The Document discloses a condensed heterocyclic compound represented by the following general formula and an organic material composition comprising the same, and states that it is possible to impart high processing stability, heat resistance, and long life to organic materials such as polymer that is susceptible to oxidative, thermal, or photo-induced breakdown.

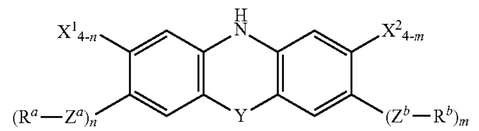

Y: a chemical single bond, —S(=O)—, or —$SO_2$—

$R^a$, $R^b$: a $C_1$-$C_{30}$ organic group that may have a substituent $Z^a$, $Z^b$: a chemical single bond, or —$SO_2$—

$X^1$, $X^2$: a hydrogen atom, a halogen atom, an alkyl group, a cyano group, a nitro group, $OR^1$, —O—CO—$R^1$, —CO—$OR^1$, —O—CO—$OR^1$, —$NR^2R^3$, —$NR^2$—CO—$R^1$, —CO—$NR^2R^3$, or —O—CO—$NR^2R^3$ n, m: 0 to 2, provided that one of them is not 0.

However, there is no specific mention of examples in which the hydrogen atom on the amino group at position 10 is replaced by a hydrocarbon group. Further, specific examples of the above general formula include a compound shown below (hereinafter abbreviated as CD-$SO_2$). However, since this compound has poor compatibility with acrylic elastomers, dispersion defects may occur when forming a cross-linkable composition using an open roll or the like.

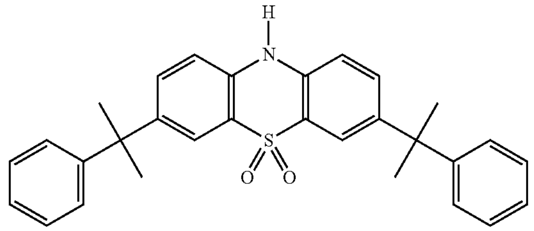

[CD-$SO_2$]

PRIOR ART DOCUMENT

Patent Document

Patent Document 1: JP-A-11-21411
Patent Document 2: WO 2011/58918 A1
Patent Document 3: JP-A-2010-254579
Patent Document 4: WO 2006/001299 A1
Patent Document 5: JP-A-2015-227402
Patent Document 6: WO 2011/093443 A1
Patent Document 7: WO 2009/096545 A1

OUTLINE OF THE INVENTION

Problem to be Solved by the Invention

Phenothiazine compounds, typified by CD-$SO_2$, can improve the heat resistance of acrylic rubber materials; however, their dispersibility in acrylic rubber is problematic, and the improvement thereof is desired. Objects of the present invention are to provide a novel compound having an anti-aging action that can improve the heat resistance of acrylic rubber and that has excellent dispersibility in acrylic rubber, and to provide an acrylic rubber composition comprising the same.

Means for Solving the Problem

The above primary object of the present invention can be achieved by a phenothiazine derivative represented by the general formula:

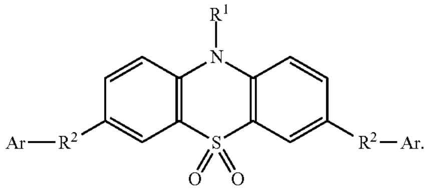

[I]

(wherein $R^1$ is a monovalent aliphatic hydrocarbon group having 1 to 20 carbon atoms or an aralkyl group having 7 to 20 carbon atoms, and $R^2$·Ar is an aralkyl group, wherein $R^2$ is a divalent aliphatic hydrocarbon group having 1 to 10 carbon atoms, and Ar is a monovalent aromatic hydrocarbon group having 6 to 10 carbon atoms).

Further, the secondary object of the present invention can be achieved by a carboxyl group-containing acrylic rubber composition comprising, based on 100 parts by weight of carboxyl group-containing acrylic rubber:

(A) 0.1 to 5 parts by weight of the phenothiazine derivative represented by the formula [I];

(B) 0.1 to 3 parts by weight of a crosslinking agent for carboxyl group-containing acrylic rubber; and (C) 0.1 to 5 parts by weight of a crosslinking accelerator for carboxyl group-containing acrylic rubber.

Effect of the Invention

The present invention provides a phenothiazine derivative that can improve the heat resistance of carboxyl group-containing acrylic rubber and that has excellent dispersibility in acrylic rubber, and carboxyl group-containing acrylic rubber comprising the same. Further, compared with conventional diphenylamine-based antioxidants, the reduction in the elongation at break of acrylic rubber crosslinked products in a high temperature environment can also be suppressed.

BRIEF DESCRIPTION OF DRAWINGS

FIG. 1: a schematic diagram of the rupture strength change rate of acrylic rubber crosslinked products (solid line: Example 3, dashed line: Example 4, dash-dotted line: Comparative Example 1, dotted line: Comparative Example 2).

FIG. 2: a schematic diagram of the elongation at break change rate of acrylic rubber crosslinked products (solid line: Example 3, dashed line: Example 4, dash-dotted line: Comparative Example 1, dotted line: Comparative Example 2).

EMBODIMENTS FOR CARRYING OUT THE INVENTION

In the phenothiazine derivative represented by the general formula [I], $R^1$ is a monovalent aliphatic hydrocarbon group having 1 to 20 carbon atoms or an aralkyl group having 7 to 20 carbon atoms. Specific examples include primary hydrocarbon groups, such as a methyl group, an ethyl group, an n-propyl group, an n-butyl group, an isobutyl group, an n-pentyl group, an n-hexyl group, an n-heptyl group, an n-octyl group, a 2-ethylhexyl group, an n-nonyl group, an n-undecyl group, an n-pentadecyl group, and an n-heptadecyl group; secondary hydrocarbon groups, such as an isopropyl group, a 2-butyl group, a 2-pentyl group, a 3-pentyl group, a 2-hexyl group, a 3-hexyl group, a 2-heptyl group, a 3-heptyl group, a 4-heptyl group, a 2-octyl group, a 3-octyl group, and a 4-octyl group; tertiary hydrocarbon groups, such as a tertiary butyl group, a 1,1-dimethyl-1-propyl group, a 1,1-dimethyl-1-butyl group, a 1,1-dimethyl-1-pentyl group, a 1,1-dimethyl-1-hexyl group, a 3-methyl-3-pentyl group, a 3-ethyl-3-pentyl group, and a 3-methyl-3-hexyl group; alicyclic hydrocarbon groups, such as a cyclopropyl group, a cyclobutyl group, a cyclopentyl group, a cyclohexyl group, a cycloheptyl group, a 1-methyl-1-cyclopentyl group, and a 1-methyl-1-cyclohexyl group; a 1-adamantyl group, a benzyl group, a 2-phenylethyl group, and the like.

In the aralkyl group represented by $R^2$·Ar in the general formula [I], $R^2$ is a divalent aliphatic hydrocarbon group having 1 to 10 carbon atoms, and specific examples thereof include a methylene group, an ethylidene group, a 1-propylidene group, a 2-propylidene group, and a 1-butylidene group. Ar is a monovalent aromatic hydrocarbon group having 1 to 10 carbon atoms, and specific examples thereof include a phenyl group, a naphthyl group, and the like. $R^2$·Ar is preferably an α,α-dimethylbenzyl group.

Such a compound, particularly a compound wherein the aralkyl group is an α,α-dimethylbenzyl group, can be easily produced by producing the following compound (hereinafter abbreviated as CD-S) according to the method described in Patent Document 6:

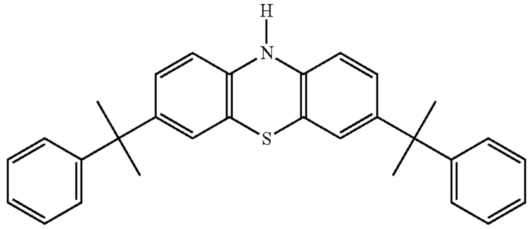

[CD-S]

followed by N-alkylation of the NH group at position 10, and further followed by oxidation of the sulfur atom at position 5 with an oxidant, such as hydrogen peroxide/acetic acid (A method). Alternatively, the N-alkylation reaction and the oxidation reaction may be performed in the reverse order (B method).

The A method is specifically explained.

As the alkylating agent, an alkylating agent represented by $R^1$—X (X is a chlorine atom, a bromine atom, or an iodine atom) can be used. The amount of the alkylating agent used is within the range of about 1 to 2 mol per mol of the compound CD-S.

In the reaction, it is preferable to react CD-S with a base, such as sodium hydride or potassium tert-butoxide, followed by reaction with an alkylating agent. The amount of the base used is within the range of about 1 to 2 mol per mol of the compound CD-S.

As the reaction solvent, N,N-dimethylformamide, tetrahydrofuran, N-methylpyrrolidone, dimethylsulfoxide, or the like can be used.

The reaction between CD-S and the base is carried out at about 0 to 10° C., and the reaction with the alkylating agent is carried out at 0 to 100° C.

As the oxidant used in the oxidation reaction, meta-chloroperbenzoic acid, peracetic acid, or acetic acid/hydrogen peroxide is used. The oxidant is used at a ratio of about 2 to 10 mol per mol of the alkylated CD-S.

The reaction solvent used is an aromatic hydrocarbon-based solvent such as toluene or xylene, an aliphatic hydrocarbon-based solvent such as hexane or octane, a chlorine-containing hydrocarbon-based solvent such as dichloromethane or chlorobenzene, acetic acid, or the like. These solvents can be used singly or in combination of two or more thereof.

The reaction is carried out at about 50 to 150° C., preferably about 80 to 120° C.

Next, the acrylic rubber composition comprising the phenothiazine derivative compound [I] of the present invention is explained.

The carboxyl group-containing acrylic rubber composition is formed by compounding carboxyl group-containing acrylic rubber with the phenothiazine derivative [I], a crosslinking agent for carboxyl group-containing acrylic rubber, and a crosslinking accelerator for carboxyl group-containing acrylic rubber.

The phenothiazine derivative [I] of the present invention is used in an amount of about 0.1 to 5 parts by weight based on 100 parts by weight of the carboxyl group-containing acrylic rubber. If the amount of the phenothiazine derivative [I] is less than this range, sufficient heat resistance and compression set resistance characteristics cannot be imparted to the acrylic rubber crosslinked product. In contrast, if the phenothiazine derivative [I] is used at a ratio greater than this range, the heat resistance and compression set resistance characteristics of the acrylic rubber crosslinked product cannot be improved, which is not economical.

Examples of the acrylic rubber include carboxyl group-containing acrylic rubber, epoxy group-containing acrylic rubber, and active chlorine group-containing acrylic rubber. In particular, carboxyl group-containing acrylic rubber is preferred.

Specific examples of generally available acrylic rubber include the Nipol AR series products produced by Zeon Corporation, the Denka ER series products produced by Denka Company Limited, the Noxtite series products produced by NOK Corporation, the Vamac series products produced by DuPont, and the like.

The carboxyl group-containing acrylic rubber is obtained by copolymerizing at least one of alkyl acrylate and alkoxyalkyl acrylate, which is used as a copolymerization component, with a carboxyl group-containing unsaturated compound.

As the alkyl acrylate, alkyl acrylates containing an alkyl group having 1 to 8 carbon atoms are used. For example, of methyl acrylate, ethyl acrylate, n-propyl acrylate, isopropyl acrylate, n-butyl acrylate, isobutyl acrylate, n-pentyl acrylate, n-hexyl acrylate, 2-ethylhexyl acrylate, n-octyl acrylate, and 2-cyanoethyl acrylate are used, and ethyl acrylate and n-butyl acrylate are preferably used.

As the alkoxyalkyl acrylate, alkoxyalkyl acrylates containing an alkoxyalkyl group having 2 to 8 carbon atoms are used. For example, methoxymethyl acrylate, ethoxymethyl acrylate, 2-methoxyethyl acrylate, 2-ethoxyethyl acrylate, and 2-n-butoxyethyl acrylate are used, and 2-methoxyethyl acrylate and 2-ethoxyethyl acrylate are preferably used.

Such alkyl acrylate or alkoxyalkyl acrylate is generally used in the copolymerization reaction at a ratio of about 60 to 99.9 wt %, preferably about 80 to 99 wt %, in the monomer mixture. When the polymerization reaction rate of the copolymerization reaction is 90% or more, the monomer mixing ratio is almost equal to the copolymerization ratio.

Although each of alkoxyalkyl acrylate and alkyl acrylate may be used singly, it is preferable that the former is used at a ratio of about 60 to 0 wt. %, and that the latter is used at a ratio of about 40 to 100 wt. %. When an alkoxyalkyl acrylate is copolymerized, oil resistance and cold resistance are well balanced. However, when the copolymerization ratio of alkoxyalkyl acrylate is greater than this range, normal state physical properties and heat resistance tend to decrease.

Usable examples of the carboxyl group-containing unsaturated compound include monobasic acid unsaturated compounds, such as acrylic acid and methacrylic acid; dibasic acid unsaturated compounds, such as maleic acid, fumaric acid, itaconic acid, and citraconic acid; and dibasic acid unsaturated compound monoesters, such as monomethyl maleate, monoethyl maleate, mono-n-butyl maleate, monomethyl fumarate, monoethyl fumarate, and mono-n-butyl fumarate. Preferably, mono-n-butyl maleate and mono-n-butyl fumarate are used.

Such a carboxyl group-containing unsaturated compound is used at a ratio of about 0.1 to 10 wt %, preferably about 1 to 5 wt %, in the monomer mixture.

In addition to the above components, an ethylenically unsaturated compound polymerizable with the above acrylate may be copolymerized at a ratio of about 20 wt % or less, preferably about 10 wt % or less. Examples of the ethylenically unsaturated compound include alkyl methacrylates and alkoxyalkyl methacrylates other than those described above, styrene, α-methylstyrene, 4-methylstyrene, amide acrylate, vinyl acetate, cyclohexyl acrylate, benzyl acrylate, vinyl chloride, vinylidene chloride, acrylonitrile, ethyl vinyl ether, butyl vinyl ether, ethylene, propylene, butadiene, isoprene, chloroprene, and the like.

As the crosslinking agent of the carboxyl group-containing acrylic rubber, a polyvalent amine compound or a derivative thereof is used. Specifically, it is possible to use an aliphatic polyvalent amine compound, a carbonate of an aliphatic polyvalent amine compound, an aliphatic polyvalent amine compound or aromatic polyvalent amine compound in which the amino group is protected with an organic group.

Examples of the aliphatic polyvalent amine compound include hexamethylenediamine. Further, examples of carbonates of aliphatic polyvalent amine compounds include hexamethylenediamine carbamate. Examples of aliphatic polyvalent amines in which the amino group is protected with an organic group include N,N'-dicinnamylidene-1,6-hexanediamine or the compounds disclosed in Patent Document 7.

Examples of the aromatic polyvalent amine compound include 4,4'-methylenedianiline, m-phenylenediamine, p-phenylenediamine, 4,4'-diaminodiphenylether, 4,4'-bis(4-aminophenoxy)biphenyl, m-xylylenediamine, p-xylylenediamine, 1,3,5-benzenetriamine, 4,4'-(m-phenylenediisopropylidene)dianiline, 4,4'-(p-phenylenediisopropylidene) dianiline, 2,2-bis[4-(4-aminophenoxy)phenyl]propane, 4,4'-diaminobenzanilide, and the like.

The polyvalent amine compounds mentioned above can be used singly or in combination of two or more thereof. Among these, hexamethylenediamine carbamate, 4,4'-diaminodiphenylether, and 2,2-bis[4-(4-aminophenoxy)phenyl]propane are preferable.

The above crosslinking agent is used at a ratio of about 0.1 to 3 parts by weight based on 100 parts by weight of the acrylic rubber. If the amount of the crosslinking agent is less than this range, crosslinking is insufficient, which leads to a decrease in the mechanical properties of the crosslinked product and reduction in crosslinking rate. If the amount of the crosslinking agent is greater than this range, crosslinking may progress excessively, and the elasticity of the crosslinked product may be reduced and the compression set resistance characteristics of the crosslinked product may be deteriorated.

As the crosslinking accelerator of the carboxyl group-containing acrylic rubber, a guanidine compound, a diazabicycloalkene compound or an organic acid salt thereof, or an aliphatic tertiary monoamine compound is used.

Examples of the guanidine compound include tetramethylguanidine, tetraethylguanidine, 1,3-diphenylguanidine, 1,3-di-o-tolylguanidine, and the like. Preferred are 1,3-diphenylguanidine and 1,3-di-o-tolylguanidine, or a combination thereof.

The diazabicycloalkene compound is preferably 1,8-diazabicyclo[5.4.0]-7-undecene or an organic acid salt thereof. Examples of the organic acid used in the organic acid salt of 1,8-diazabicyclo[5.4.0]-7-undecane include organic monobasic acids or organic dibasic acids.

Examples of the organic monobasic acid include n-hexanoic acid, n-heptanoic acid, n-octanoic acid, 2-ethylhexanoic acid, n-capric acid, n-lauric acid, p-toluenesulfonic acid, phenol, and the like. Examples of the organic dibasic acid include adipic acid, pimelic acid, suberic acid, azelaic acid, sebacic acid, undecanedioic acid, dodecanedioic acid, terephthalic acid, orthophthalic acid, phthalic acid, and the like. Preferable examples are monocarboxylic acids or dicarboxylic acids having 6 to 18 carbon atoms.

Examples of the aliphatic tertiary monoamine compound include tri-n-octylamine, tri-2-ethylhexylamine, tri-n-decylamine, tri-n-dodecylamine, tri-n-tetradecylamine, tri-n-hexadecylamine, tri-n-octadecylamine, N,N-dimethyldecylamine, N,N-dimethylundecylamine, N,N-dimethyldodecylamine, N,N-dimethyltetradecylamine, N,N-dimethylhexadecylamine, N,N-dimethyloctadecylamine, and the like. Particularly preferred are N,N-dimethyldecylamine, N,N-dimethylundecylamine, N,N-dimethyldodecylamine, N,N-dimethyltetradecylamine, N,N-dimethylhexadecylamine, and N,N-dimethyloctadecylamine.

The above crosslinking accelerator is used in an amount of about 0.1 to 5 parts by weight, preferably about 0.3 to 3 parts by weight, based on 100 parts by weight of the acrylic rubber. If the amount of the crosslinking accelerator is less than this range, the crosslinking rate may be significantly reduced, the mechanical properties of the acrylic rubber after crosslinking may be reduced, and the mechanical properties after heat aging may be reduced. In contrast, if the amount of the crosslinking accelerator used is greater than this range, the compression set resistance characteristics of the acrylic rubber may be deteriorated.

The carboxyl group-containing acrylic rubber composition may be compounded with, if necessary, various additives, such as fillers, processing aids, plasticizers, softeners, colorants, stabilizers, adhesion aids, mold release agents, conductivity imparting agents, thermal conductivity imparting agents, surface non-adhesives, tackifiers, flexibility imparting agents, heat resistance improving agents, flame retardants, UV absorbers, oil resistance improving agents, scorch retarders, and lubricants.

Examples of the filler include silica, such as basic silica and acidic silica; metal oxides, such as zinc oxide, calcium oxide, titanium oxide, and aluminum oxide; metal hydroxides, such as magnesium hydroxide, aluminum hydroxide, and calcium hydroxide; carbonates, such as magnesium carbonate, aluminum carbonate, calcium carbonate, and barium carbonate; silicates, such as magnesium silicate, calcium silicate, sodium silicate, and aluminum silicate; sulfates, such as aluminum sulfate, calcium sulfate, and barium sulfate; metal sulfides, such as molybdenum disulfide, iron sulfide, and copper sulfide; synthetic hydrotalcite; diatomaceous earth, asbestos, lithopone (zinc sulfide/barium sulfide), graphite, carbon black (MT carbon black, SRF carbon black, FEF carbon black, etc.), fluorinated carbon, calcium fluoride, coke, quartz fine powder, zinc white, talc, mica powder, wollastonite, carbon fiber, aramid fiber, various whiskers, glass fiber, organic reinforcing agents, organic fillers, and the like.

Examples of the processing aid include higher fatty acids, such as stearic acid, oleic acid, palmitic acid, and lauric acid; higher fatty acid salts, such as sodium stearate and zinc stearate; higher fatty acid amides, such as amide stearate and amide oleate; higher fatty acid esters, such as ethyl oleate; higher aliphatic amines, such as stearyl amine and oleyl amine; petroleum-based waxes, such as carnauba wax and ceresin wax; polyglycols, such as ethylene glycol, glycerol, and diethylene glycol; aliphatic hydrocarbons, such as vaseline and paraffin; silicone-based oils, silicone-based polymer, low-molecular-weight polyethylene, phthalic acid esters, phosphoric acid esters, rosin, (halogenated) dialkyl amine, (halogenated) dialkyl sulfone, surfactants, and the like.

Examples of the plasticizer include epoxy resin, and derivatives of phthalic acid and sebacic acid. Examples of the softener include lubricating oil, process oil, coal tar, castor oil, and calcium stearate. Examples of the antioxidant include phenylenediamines, phosphates, quinolines, cresols, phenols, dithiocarbamate metal salts, and the like.

The carboxyl group-containing acrylic rubber composition can be prepared by compounding the above carboxyl group-containing acrylic rubber with the phenothiazine derivative [I], a crosslinking agent, a crosslinking accelerator, and other compounding agents that are optionally used, and mixing them using a Banbury mixer, a pressure kneader, an open roll, or the like. The crosslinking thereof is carried out by primary crosslinking at about 120 to 250° C. for about 1 to 60 minutes, and optionally oven crosslinking (secondary crosslinking) at about 120 to 200° C. for about 1 to 20 hours.

EXAMPLES

The following describes the present invention with reference to Examples.

Reference Example 1

Production of 3,7-bis(α,α-dimethylbenzyl)-10H-phenothiazine [CD-S]

In a 1000-ml four-necked flask equipped with a magnetic stirrer, a thermometer, nitrogen gas inlet and outlet, and a reflux cooling tube, 59.8 g (0.3 mol) of phenothiazine, 1.44 g of p-toluenesulfonic acid, and 280 ml of toluene were charged and the mixture was heated to 80° C. Then, 70.9 g (0.6 mol) of α-methylstyrene was added, and the mixture was reacted in a nitrogen gas atmosphere for 1 hour.

After the reaction mixture was cooled down to the room temperature, the toluene was distilled off under reduced pressure to obtain 132 g of a purple solid reaction product. The reaction product was recrystallized with 600 to 800 ml of ethanol to obtain 90 g (yield: 69%) of crude CD-S as pale red purple crystals. Further, 20 g of the crude CD-S was recrystallized again with ethanol to obtain 18 g of purified CD-S as colorless flaky crystals.

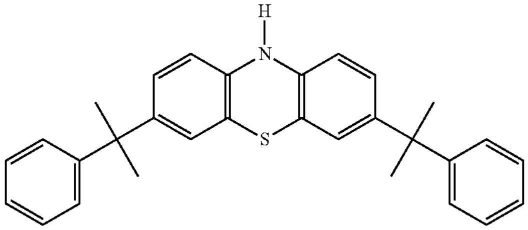

[CD-S]

Reference Example 2

Production of 3,7-bis(α,α-dimethylbenzyl)-10H-phenothiazine-5,5-dioxide [CD-$SO_2$]

In a 500-ml four-necked flask equipped with a magnetic stirrer, a thermometer, nitrogen gas inlet and outlet, and a reflux cooling tube, 24.9 g (0.125 mol) of phenothiazine, 0.6 g of p-toluenesulfonic acid, and 115 ml of toluene were charged and the mixture was heated to 80° C. Then, 29.5 g (0.25 mol) of α-methylstyrene was added, and the mixture was reacted in a nitrogen gas atmosphere for 1 hour.

Next, 30 g of acetic acid was added to the reaction mixture, then 42.5 g of a 30% hydrogen peroxide solution was added in five batches, and the mixture was further reacted at 80° C. for 2 hours. After the content was cooled down to the room temperature and allowed to stand, the upper toluene layer was poured into 500 ml of methanol. After being left at room temperature overnight, 42.5 g (yield: 72%) of crude CD-$SO_2$ was obtained as pale-yellow crystals. This was recrystallized with ethanol to obtain 38 g (yield: 65%) of CD-$SO_2$ as pale-yellow needle-like crystals.

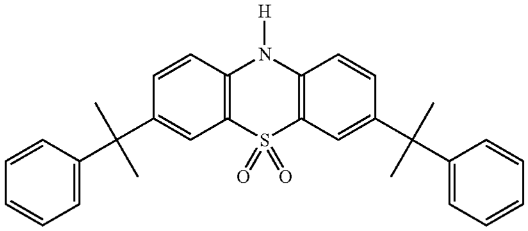

[CD-$SO_2$]

Example 1

Production of 10-benzyl-3,7-bis(α,α-dimethylbenzyl)-10H-phenothiazine-5,5-dioxide [CD-$SO_2$-Bn]

In a 300-ml four-necked flask equipped with a magnetic stirrer, a thermometer, gas inlet and outlet, and a reflux cooling tube, 21.8 g (50 mmol) of the purified CD-S and 160 ml of N,N-dimethylformamide were charged and the mixture was cooled down to 5° C. or lower in a nitrogen atmosphere. While maintaining the temperature in the system at 10° C. or lower, 1.8 g (75 mmol) of sodium hydride was added, and the mixture was reacted for 1 hour. After 9.5 g (75 mmol) of benzyl chloride was added, the mixture was reacted at 70° C. for 1 hour. The obtained reaction mixture was cooled down to the room temperature and then poured into a saturated aqueous sodium chloride solution. The product was extracted with dichloromethane, and the organic layer was dried over anhydrous magnesium sulfate. After the magnesium sulfate was removed by filtration, volatile components were distilled off under reduced pressure from the filtrate, thereby obtaining 27.2 g of crude CD-S-Bn as a slightly yellowish solid.

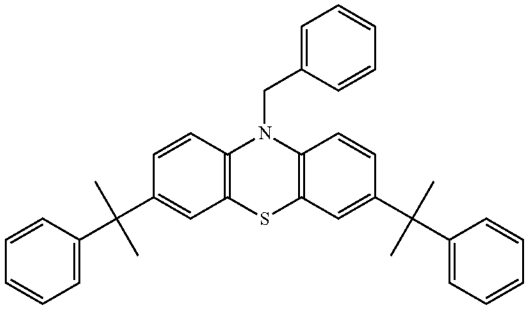

[CD-S-Bn]

26.3 g of the crude CD-S-Bn was dissolved in 300 ml of toluene, and the resultant was charged in a 500-ml three-necked flask equipped with a magnetic stirrer, a thermometer, and a reflux cooling tube. Then, 30 g of acetic acid and 34 g of a 30% hydrogen peroxide solution were sequentially charged, and the mixture was reacted at 90° C. for 2 hours.

After the content was cooled down to the room temperature, the upper toluene layer was taken out, and volatile materials were distilled off under reduced pressure. The obtained pale-yellow solid was recrystallized with toluene, thereby obtaining 19.5 g (yield from CD-S: 70%) of CD-$SO_2$-Bn as colorless crystals.

$^1$H NMR (400 MHz, Acetone d6, δ ppm):

1.74 (s, 12H, $—C(CH_3)_2—$)

5.56 (s, 2H, $N—CH_2—Ar$)

7.15~7.45 (m, 19H, Ar)

7.93 (d, J=2.4 Hz, 2H, Ar)

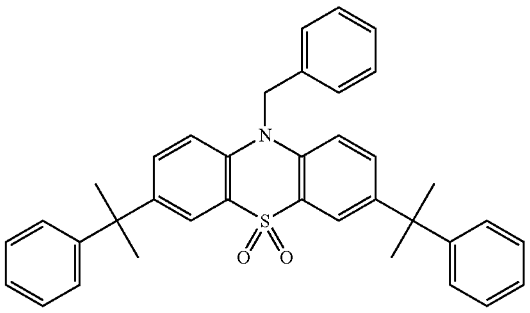

[CD-$SO_2$-Bn]

Example 2

Production of 10-n-propyl-3,7-bis(α,α-dimethylbenzyl)-10H-phenothiazine-5,5-dioxide [CD-$SO_2$—Pr]

In a 300-ml four-necked flask equipped with a magnetic stirrer, a thermometer, gas inlet and outlet, and a reflux cooling tube, 21.8 g (50 mmol) of the purified CD-S and 160 ml of N,N-dimethylformamide were charged and the mixture was cooled down to 5° C. or lower in a nitrogen atmosphere. While maintaining the temperature in the system at 10° C. or lower, 1.8 g (75 mmol) of sodium hydride was added, and the mixture was reacted for 1 hour. After 8.0 g (65 mmol) of N-propyl bromide was added, the mixture was reacted at 70° C. for 1 hour. The obtained reaction mixture was cooled down to the room temperature and then poured into a saturated aqueous sodium chloride solution. The product was extracted with ethyl acetate, and the organic layer was dried over anhydrous magnesium sulfate. After the magnesium sulfate was removed by filtration, volatile components were distilled off under reduced pressure from the filtrate, thereby obtaining 24.9 g of crude CD-S—Pr as a slightly yellowish solid.

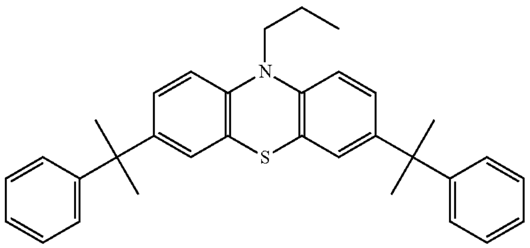

[CD-S-Pr]

24.9 g of the crude CD-S—Pr was dissolved in 250 ml of toluene, and the resultant was charged in a 500-ml three-necked flask equipped with a magnetic stirrer, a thermometer, and a reflux cooling tube. Then, 40 g of acetic acid and 34 g of a 30% hydrogen peroxide solution were sequentially charged, and the mixture was reacted at 90° C. for 2 hours.

After the content was cooled down to the room temperature, the upper toluene layer was taken out, and volatile materials were distilled off under reduced pressure. The obtained red highly viscous liquid was recrystallized with toluene/ethanol (5/1(v/v)), thereby obtaining 21.7 g (yield from CD-S: 85%) of CD-$SO_2$—Pr as colorless crystals.

$^1$H NMR (400 MHz, $CDCl_3$, δ ppm):

1.01 (t, J=7.2 Hz, 3H, $—CH_2CH_2CH_3$)

1.73 (s, 12H, $—C(CH_3)_2—$)

1.89 (sectet, J=7.6 Hz, 2H, $—CH_2CH_2CH_3$)

4.03 (t, J=8.0 Hz, 2H, $—CH_2CH_2CH_3$)

7.14-7.32 (m, 14H, Ar)

8.13 (d, J=2.4 Hz, 2H, Ar)

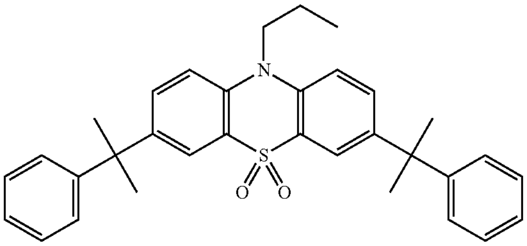

[CD-$SO_2$-Pr]

Example 3

| | |
|---|---|
| Carboxyl group-containing acrylic rubber (Noxtite PA-521, Tg: −21° C., produced by Unimatec Co., Ltd.) | 100 parts by weight |
| FEF carbon black (Seast GSO, produced by Tokai Carbon Co., Ltd.) | 60 parts by weight |
| Stearic acid (TST, produced by Miyoshi Oil & Fat Co., Ltd.) | 1 part by weight |
| Polyoxyethylene stearyl ether phosphate (Phosphanol RL-210, produced by Toho Chemical Industry Co., Ltd.) | 0.5 parts by weight |
| Stearyl amine (n-octadecyl amine) (Farmin 80S, produced by Kao Chemical Corporation) | 1 part by weight |
| Crosslinking accelerator (Vulcofac ACT55, produced by Safic-Alcan) | 1 part by weight |
| Hexamethylenediamine carbamate (Cheminox AC6F, produced by Unimatec Co., Ltd.) | 0.6 parts by weight |
| CD-$SO_2$-Bn | 2 parts by weight |

Among the above components, the carboxyl group-containing acrylic rubber, FEF carbon black, stearic acid, and polyoxyethylene stearyl ether phosphate were mixed with a Banbury mixer. The obtained mixture was mixed with predetermined amounts of the other components using an open roll, thereby obtaining an acrylic rubber composition. This composition was subjected to primary crosslinking at 180° C. for 8 minutes using a 100-ton press molding machine and oven crosslinking at 175° C. for 4 hours to obtain a sheet-like crosslinked product having a thickness of about 2 mm and a cylindrical crosslinked product having a diameter of about 29 mm and a height of about 12.5 mm.

In addition, the surface of the acrylic rubber composition obtained by mixing with an open roll was visually observed, and the presence or absence of minute white spots caused by the antioxidant was examined.

The crosslinking characteristics of the acrylic rubber composition and the physical properties of its crosslinked product were measured in the following manner.

Mooney scorch test: according to JIS K6300-1 corresponding to ISO 289-1 (125° C.). Using a Mooney viscometer (AM-3, produced by Toyo Seiki Seisaku-sho, Ltd.), the minimum Mooney viscosity (ML min) and scorch time (t5) values were measured.

Crosslinking test: according to JIS K6300-2 corresponding to ISO 6502 (180° C., 12 minutes). Using a rotorless rheometer (RLR-3, produced by Toyo Seiki Seisaku-sho, Ltd.), ML, MH, tc (10), and tc (90) values were measured.

ML: minimum torque

MH: maximum torque tc (10): time required for the crosslinking torque to reach ML+(MH−ML)×0.1 tc (90): time required for the crosslinking torque to reach ML+(MH−ML)×0.9

Normal state physical properties: according to JIS K6251 corresponding to ISO 37 and JIS K6253 corresponding to ISO 37

Heat aging test: according to JIS K6257 corresponding to ISO 188 (190° C.: 70 hours, 250 hours, 375 hours, 500 hours)

Compression set: according to JIS K6262 corresponding to ISO 815-1 (175° C.: 70 hours, 500 hours)

Example 4

In Example 3, the same amount (2 part by weight) of CD-$SO_2$—Pr was used in place of the CD-$SO_2$-Bn.

Comparative Example 1

In Example 3, the same amount (2 part by weight) of 4,4'-bis(α,α-dimethylbenzyl)diphenylamine (Nocrac CD, produced by Ouchi Shinko Chemical Industrial Co., Ltd.) was used in place of the CD-$SO_2$-Bn.

Comparative Example 2

In Example 3, the same amount (2 part by weight) of CD-$SO_2$ was used in place of the CD-$SO_2$-Bn.

Following tables show results obtained in the above Examples 3 to 4 and Comparative Examples 1 to 2.

TABLE

| Measurement item | | Example 3 | Example 4 | Comparative Example 1 | Comparative Example 2 |
|---|---|---|---|---|---|
| Presence or absence of minute white spots on the surface of the uncrosslinked acrylic rubber composition | | none | none | none | yes |
| Mooney scorch test (125° C.) | | | | | |
| ML min | (pts) | 53 | 54 | 47 | 49 |
| t5 | (min) | 5.9 | 5.9 | 6.3 | 7.0 |
| Crosslinking test (180° C.) | | | | | |
| tc (10) | (min) | 0.64 | 0.65 | 0.62 | 0.68 |
| tc (90) | (min) | 6.71 | 6.78 | 6.70 | 6.95 |
| ML | (N · m) | 0.23 | 0.22 | 0.20 | 0.21 |
| MH | (N · m) | 0.80 | 0.78 | 0.78 | 0.77 |
| Normal state physical properties | | | | | |
| Hardness | (Duro A) | 68 | 68 | 68 | 68 |
| 100% modulus | (MPa) | 4.6 | 4.5 | 3.7 | 3.9 |
| Breaking strength | (MPa) | 14.3 | 14.7 | 13.9 | 13.4 |
| Elongation at break | (%) | 280 | 290 | 300 | 270 |
| Heat aging test (190° C., 70 hours) | | | | | |
| Hardness change | (Duro A) | +6 | +7 | +4 | +7 |
| 100% modulus change rate | (%) | −11 | −11 | −13 | −5 |
| Breaking strength change rate | (%) | −21 | −24 | −27 | −18 |
| Elongation at break change rate | (%) | −1 | +5 | +13 | +10 |
| Heat aging test (190° C., 250 hours) | | | | | |
| Hardness change | (Duro A) | +14 | +15 | +17 | +11 |
| 100% modulus change rate | (%) | −43 | −33 | −14 | −36 |
| Breaking strength change rate | (%) | −66 | −63 | −65 | −66 |
| Elongation at break change rate | (%) | +20 | +13 | −14 | +31 |
| Heat aging test (190° C., 375 hours) | | | | | |
| Hardness change | (Duro A) | +20 | +21 | +22 | +20 |
| 100% modulus change rate | (%) | −26 | −11 | — | −18 |

TABLE-continued

| Measurement item | | Example 3 | Example 4 | Comparative Example 1 | Comparative Example 2 |
|---|---|---|---|---|---|
| Breaking strength change rate | (%) | −75 | −71 | −55 | −75 |
| Elongation at break change rate | (%) | −9 | −29 | −68 | +7 |
| Heat aging test (190° C., 500 hours) | | | | | |
| Hardness change | (Duro A) | +27 | +28 | +28 | +25 |
| 100% modulus change rate | (%) | −2 | — | — | +10 |
| Breaking strength change rate | (%) | −64 | −58 | −24 | −64 |
| Elongation at break change rate | (%) | −61 | −73 | −91 | −58 |
| Compression set | | | | | |
| 175° C., 70 hours | (%) | 22 | 23 | 23 | 22 |
| 175° C., 500 hours | (%) | 40 | 41 | 40 | 41 |

The dispersibility of the antioxidant in the uncrosslinked acrylic rubber composition was better for CD-$SO_2$-Bn used in Example 3 and CD-$SO_2$—Pr used in Example 4, compared with CD-$SO_2$ used in Comparative Example 2, and was equivalent to Nocrac CD used in Comparative Example 1. In the heat aging test, Examples 3 and 4 showed a less elongation at break reduction rate than Comparative Example 1. In FIG. 1, the rupture strength change rate when the test time was 250 to 500 hours overlapped between Example 3 and Comparative Example 2.

The invention claimed is:

1. A phenothiazine derivative represented by the general formula:

[I]

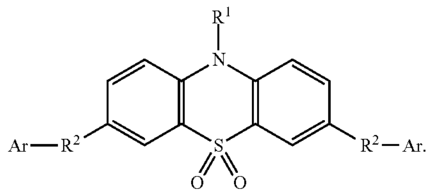

wherein:

$R^1$ is a monovalent aliphatic hydrocarbon group having 1 to 20 carbon atoms or an aralkyl group having 7 to 20 carbon atoms, and $R^2$·Ar is an α,α-dimethylbenzyl group.

2. An acrylic rubber composition comprising a carboxyl group-containing acrylic rubber and the phenothiazine derivative according to claim 1.

3. A carboxyl group-containing acrylic rubber composition comprising, based on 100 parts by weight of carboxyl group-containing acrylic rubber:

(A) 0.1 to 5 parts by weight of a phenothiazine derivative represented by the general formula:

[I]

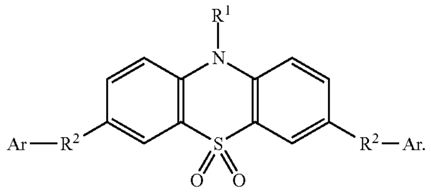

wherein:

$R^1$ is a monovalent aliphatic hydrocarbon group having 1 to 20 carbon atoms or an aralkyl group having 7 to 20 carbon atoms, $R^2$·Ar is an aralkyl group, $R^2$ is a divalent aliphatic hydrocarbon group having 1 to 10 carbon atoms, and Ar is a monovalent aromatic hydrocarbon group having 6 to 10 carbon atoms;

(B) 0.1 to 3 parts by weight of a crosslinking agent for carboxyl group-containing acrylic rubber; and (C) 0.1 to 5 parts by weight of a crosslinking accelerator for carboxyl group-containing acrylic rubber.

4. The carboxyl group-containing acrylic rubber composition according to claim 3, wherein the crosslinking agent for carboxyl group-containing acrylic rubber is a polyvalent amine compound or a derivative thereof.

5. The carboxyl group-containing acrylic rubber composition according to claim 4, wherein the polyvalent amine compound or a derivative thereof is a hexamethylenediamine, a hexamethylenediamine carbamate, a 4,4'-diaminodiphenylether or a 2,2-bis[4-(4-aminophenoxy)phenyl]propane.

6. The carboxyl group-containing acrylic rubber composition according to claim 3, wherein the crosslinking accelerator for carboxyl group-containing acrylic rubber is a guanidine compound, a diazabicycloalkene compound or an organic acid salt thereof, or an aliphatic tertiary monoamine compound.

7. The carboxyl group-containing acrylic rubber composition according to claim 6, wherein the guanidine compound is 1,3-diphenylguanidine or 1,3-di-o-tolylguanidine.

8. The carboxyl group-containing acrylic rubber composition according to claim 6, wherein the diazabicycloalkene compound or an organic acid salt thereof is 1,8-diazabicyclo [5.4.0]-7-undecene or an organic acid salt thereof.

* * * * *